(12) United States Patent
Margalit et al.

(10) Patent No.: US 10,496,289 B2
(45) Date of Patent: Dec. 3, 2019

(54) SYSTEM AND METHODS FOR INCREASING USEFUL LIFETIME OF A FLASH MEMORY DEVICE

(71) Applicant: NUVOTON TECHNOLOGY CORPORATION, Hsinchu Science Park, R.O.C. (TW)

(72) Inventors: Ilan Margalit, Tel-Aviv (IL); Ziv Hershman, Givat Shmuel (IL); Dan Morav, Herzliya (IL); Einat Luko, Herzliya (IL); Oren Tanami, Ra'ananna (IL); Yossef Talmi, Zur Moshe (IL)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 174 days.

(21) Appl. No.: 15/184,258

(22) Filed: Jun. 16, 2016

(65) Prior Publication Data

US 2017/0364282 A1 Dec. 21, 2017

(51) Int. Cl.
*G06F 3/06* (2006.01)

(52) U.S. Cl.
CPC .......... *G06F 3/0616* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| 6,842,378 | B2 | 1/2005 | Chang |
| 8,995,197 | B1* | 3/2015 | Steiner ................. G06F 12/0246 |
| | | | 365/185.19 |
| 9,329,797 | B2* | 5/2016 | Darragh ................. G06F 3/0653 |
| 9,478,303 | B1* | 10/2016 | Parker ................. G11C 16/3418 |
| 2003/0133340 | A1* | 7/2003 | Lee ..................... G11C 16/3454 |
| | | | 365/200 |

(Continued)

OTHER PUBLICATIONS

Keating, K. et al. "Programming and Erasing FLASH Memory on the MC68HC908AS60," AN1827. pp. 1-60.

(Continued)

*Primary Examiner* — Ryan Bertram
*Assistant Examiner* — Alex G Olson
(74) *Attorney, Agent, or Firm* — Oliff PLC

(57) ABSTRACT

A system for improving utilization of a nonvolatile flash memory device which has pages whose guaranteed per-cycle erase time and guaranteed number of cycles are known, the system comprising erase time determination functionality for individual pages; de-facto total erase-time accumulation functionality incrementing, for each erase cycle to which an individual page is subjected, by the individual page's de facto erase time per cycle as provided by the erase time measurement functionality; and flash memory page usage monitoring functionality operative to control usage of pages in flash memory including selecting at least one individual flash memory page depending on a comparison between the individual flash memory page's de facto total erase time and a guaranteed erase time computed as a product of the guaranteed per-cycle erase time and of the guaranteed number of cycles.

19 Claims, 2 Drawing Sheets

---

210: use erase time determination functionality (e.g. firmware-implemented/processor-implemented) to provide individual pages' de facto erase time per cycle for at least one cycle
(e.g. as per the flow of Fig. 1)

↓

220: use de-facto total erase-time accumulation functionality (e.g. firmware-implemented/processor-implemented) to store each individual page's cumulative, over cycles, de facto erase time ("de facto total erase time") including incrementing, for each erase cycle to which an individual page is subjected, by the individual page's de facto erase time per cycle as provided by the erase time determination functionality

↓

230: flash memory page usage monitoring functionality (e.g. firmware-implemented/processor-implemented) controls usage of pages in flash memory including selecting at least one individual flash memory page for a total number of cycles which exceeds the guaranteed number of cycles depending on a comparison between the individual flash memory page's de facto total erase time and a guaranteed erase time (e.g. total-page-erase-time (TPET)) computed as a product of the guaranteed per-cycle erase time and of the guaranteed number of cycles. Optionally, repeatedly use next-page selection logic to select a page to be next written on by employing (i) a first page selection consideration whereby flash memory pages with low de facto erase time per cycle are preferred over flash memory pages with high erase time per cycle; and, optionally, (ii) at least one additional page selection consideration such as a preference for flash memory pages subjected thus far to relatively few erase cycles

(56) References Cited

U.S. PATENT DOCUMENTS

| | | | |
|---|---|---|---|
| 2006/0053247 A1* | 3/2006 | Cheung | G11C 16/16 711/103 |
| 2007/0260811 A1* | 11/2007 | Merry, Jr. | G06F 12/0246 711/103 |
| 2009/0081819 A1* | 3/2009 | Okayasu | G05B 19/4184 438/17 |
| 2010/0027335 A1* | 2/2010 | Kim | G11C 11/5628 365/185.09 |
| 2010/0064094 A1* | 3/2010 | Yeh | G06F 12/0246 711/103 |
| 2010/0088557 A1* | 4/2010 | Weingarten | G06F 11/1068 714/704 |
| 2010/0180073 A1* | 7/2010 | Weingarten | G06F 12/0246 711/103 |
| 2010/0199019 A1* | 8/2010 | Fisher | G06F 12/02 711/103 |
| 2011/0157982 A1* | 6/2011 | Lee | G11C 16/0425 365/185.03 |
| 2012/0216085 A1* | 8/2012 | Weingarten | G11C 16/349 714/718 |
| 2013/0061101 A1* | 3/2013 | Fitzpatrick | G11C 16/349 714/718 |
| 2014/0013032 A1* | 1/2014 | Min | G06F 12/0246 711/103 |
| 2015/0186055 A1* | 7/2015 | Darragh | G06F 3/0616 711/103 |
| 2015/0186072 A1* | 7/2015 | Darragh | G06F 3/0653 711/103 |
| 2016/0162215 A1* | 6/2016 | Jayaraman | G06F 3/0659 711/103 |
| 2016/0170871 A1* | 6/2016 | Hyun | G06F 3/0679 711/103 |
| 2016/0335178 A1* | 11/2016 | Patel | G06F 12/0246 |
| 2016/0343449 A1* | 11/2016 | Lee | G11C 11/5635 |

OTHER PUBLICATIONS

Agrawal, N. et al. "Design Tradeoffs for SSD Performance," USENIX Annual Technical Conference. (Jun. 2008).

Abstract and figures of Indian Patent Publication IN01022CH2009A.

* cited by examiner

FIG. 1

1. Starting conditions which may include:
   a. For simplicity, all flash pages may be assumed to be written.
   b. initially, all pages' PERTn values are initialized to PERTn = Total-page-erase-time (TPET).
   c. new data has just arrived for storage in the flash

↓

2. Apply any conventional next-page priority management scheme/algorithm e.g. as described in Agrawal et al cited herein to identify the "best choice" page to be recycled

↓

3. Apply Page Erase of *guessed erase time (GET)* duration to the current page selected in operation 2.

↓

4. Verify erase quality (e.g. utilize a stress-read feature available in embedded flash arrays.

↓

5. If erase quality is good, using any suitable goodness criterion known in the art, add current page's empirical erase time *CPETn* to APETn, the actual cumulative erase time applied, and go to step 7

↓

6. Else, add *ETIS* to current page's empirical erase time CPETn; apply (further) erase whose duration is *ETIS*, and go to step 5.

↓

7. Each time a page n is recycled, reduce page n's practical (aka empirical) endurance by 1 e.g. increment PEANn by 1.

↓

8. new Page-erase-estimated-remaining-time PERTn = current (i.e. from previous iteration of this flow) Page-erase-estimated-remaining-time (PERTn) - CPETn (the duration e.g. in ms, of the most recent successful erase).

↓

9. Operations 2 – 8 may be iterated time and again, e.g. each time new data arrives for storage in the flash. Each time the above process is carried out, the resulting empirical erase time per page is expected to be less than max erase time (MET)

FIG. 2

210: use erase time determination functionality (e.g. firmware-implemented/processor-implemented) to provide individual pages' de facto erase time per cycle for at least one cycle
(e.g. as per the flow of Fig. 1)
220: use de-facto total erase-time accumulation functionality (e.g. firmware-implemented/processor-implemented) to store each individual page's cumulative, over cycles, de facto erase time ("de facto total erase time") including incrementing, for each erase cycle to which an individual page is subjected, by the individual page's de facto erase time per cycle as provided by the erase time determination functionality
230: flash memory page usage monitoring functionality (e.g. firmware-implemented/processor-implemented) controls usage of pages in flash memory including selecting at least one individual flash memory page for a total number of cycles which exceeds the guaranteed number of cycles depending on a comparison between the individual flash memory page's de facto total erase time and a guaranteed erase time (e.g. total-page-erase-time (TPET)) computed as a product of the guaranteed per-cycle erase time and of the guaranteed number of cycles. Optionally, repeatedly use next-page selection logic to select a page to be next written on by employing (i) a first page selection consideration whereby flash memory pages with low de facto erase time per cycle are preferred over flash memory pages with high erase time per cycle; and, optionally, (ii) at least one additional page selection consideration such as a preference for flash memory pages subjected thus far to relatively few erase cycles

SYSTEM AND METHODS FOR INCREASING USEFUL LIFETIME OF A FLASH MEMORY DEVICE

REFERENCE TO CO-PENDING APPLICATIONS

None.

FIELD OF THIS DISCLOSURE

The present invention relates generally to memory devices and more particularly to flash memory devices.

BACKGROUND FOR THIS DISCLOSURE

Flash manufacturers include foundries, e.g. TSMC and Globalfoundries. Flash technology developers such as Silicon Storage Technology, Inc. (SST) provide embedded NVM technology to foundries inter alia.

US2010027335A describes wear level optimization which takes into consideration both the number of times a page was erased, and the time elapsed from last erase performed for a specific page.

A Freescale Semiconductor, Inc. document by K. Keating et al, entitled "Programming and Erasing FLASH Memory on the MC68HC908AS60" and referenced AN1827 describes Programming and Erasing FLASH Memory on MC68HC908AS60 devices and teaches inter alia that "Program disturb is avoided by using an iterative program and margin read technique known as the smart programming algorithm" and that "the internal charge pump is required for program, margin read, and erase operations of the flash".

Applications including a processor and memories (e.g. SoC—systems on chip) conventionally provide a configurable and programmable interface control unit, typically implemented in hardware and allowing the processor to use the memory e.g. to translate logical operations such as fetch, read, write, and erase/program (for nonvolatile memory) into electrical signaling to the memory. Any parameters used for managing flash memory are, themselves, typically stored in nonvolatile memory.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

The term "Flash", "flash memory" as used herein is intended to include NOR-type flash as well as any other electronic, non-volatile storage medium that can be electrically erased and reprogrammed but can endure only a limited number of write cycles in each specific block or a limited number of program/erase cycles due to a physical constraint on the total, cumulative erase time for the non-volatile memory device. The flash memory may operate in any suitable device such as but not limited to integrated circuits, memory cards, USB flash drives, solid-state drives, personal computers, PDAs, digital audio players, digital cameras, mobile phones, synthesizers, video games, scientific and medical devices, robots, and any other digital product.

Inter alia, the term "Flash memory" is intended to include embedded Flash memory, commonly used in integrated circuits, including but not limited to system-on-chip (SOC) devices.

Embodiments of the invention are applicable to any suitable flash memory technology e.g. wafer foundry-provided flash technology.

Erasing is among the most lengthy, typically the most lengthy, operation performed by a flash memory device. A flash memory device is characterized by its "endurance" in that the device can only sustain a certain number of write/erase cycles e.g. thousands or millions of cycles depending on the flash technology employed. Typically, the flash memory device is provided with a specification of the guaranteed endurance. However, most flash-device employing applications would benefit from increasing the flash device's endurance beyond that formally specified, so as to extend the useful lifetime of the subject device and hence of the application.

Flash device providers are committed to specifications that support even extreme operating conditions hence are based on conservative guard bands providing extra erase or program time to guarantee that internal logic levels maintained by nonvolatile memory elements after program or erase are far enough from predetermined threshold/s. Guardbands may be determined during characterization and can be in the order of a few to a few dozen mSec for erasing and a few uSec for programming given that, or assuming that page erase times and memory program times ordinarily fall within these ranges. Certain embodiments herein enable users of flash devices to systematically determine an extent to which guard bands can safely be disregarded.

Certain embodiments seek to provide a flash endurance optimization method to be used in conjunction with a wide variety of (e.g. conventional) iterative erase and/or program algorithms. For example, an iterative erase process is described in FIG. 1 of U.S. Pat. No. 6,842,378. The process of FIG. 1 includes a cycle including an erase operation S104, an erase verify operation S105 and a decision step S106 which terminates the cycle if the erase verify passed successfully, and repeats steps S104 and S105 (iterates) otherwise. Iterative programming and margin reads, for Programming and Erasing FLASH Memory on MC68HC908AS60 devices, are described in a document entitled "Programming and erasing flash memory . . . " which may be ordered from freescale.com using AN1827/D as a reference.

Certain embodiments seek to provide improved next-page selection functionality in which de facto (aka empirical or practical) erase time per cycle is determined and serves as a consideration in preferring one page over another. Typically, de facto erase time per cycle is not a standalone decision factor and other factors are also considered in determining which page to select next for recycling, such as but not limited to the number of erase cycles thus far applied to various pages which are candidate next-pages. For example, given two pages thus far erased the same number of times, the de facto erase time may partly or entirely determine which page will next be cycled.

Commercially available flash memory devices come with a specification stipulating the "endurance"—total (typically per page) number of erase/program cycles that, the manufacturer insists, should not be exceeded if application developers desire to guarantee adequate performance of the device. For example, if the endurance is 10K (i.e. approximately 10,000 cycles), each of the device's pages may safely be erased and programmed 10K times. For at least some use cases, the true limitation of the technology may not in fact be the endurance but rather the total (typically per-page) erase time. But since the specification also stipulates an erase time per erase cycle, a safe, reliable representation for the true limitation of the technology, i.e. the total (typically per-page) erase time, can be computed by application developers as no less than the product of (erase time per erase cycle) times endurance. The specification-stipulated erase time per erase cycle is in fact a "worst case" value in the sense that many or most pages have a de facto erase time per erase cycle which may be significantly shorter than the specification-stipulated erase time per erase cycle. So, a. if erase time determination functionality can be provided which is operative to measure pages' de facto erase time per cycle and b. if a total erase time accumulation functionality can be provided to accumulate the de facto total erase time, using each erase cycle's real de facto erase time given the page which was erased, then c. the application developer may safely subject flash memory pages to a total number of cycles which exceeds the specification-stipulated endurance, depending on a comparison between the de facto total erase time (from b above) and the computed representation of the true limitation of the technology (the above-computed product).

According to certain embodiments, erase/program accumulated erase time is monitored per page, rather than merely monitoring the number of erases per page. Wear leveling optimization is then performed e.g. by selecting pages to store incoming data, based inter alia on comparing the different erase/program accumulated erase times stored for different pages in the flash memory device. For example, each time a page needs to be selected, the page whose erase/program accumulated erase time is lowest, may be selected. It is appreciated that certain prior art systems teach that "Wear level" may be operationalized using the number of erases, rather than using the accumulated erase time. For example, Published Indian Patent Application No. IN01022CH2009A, entitled " . . . Bad Block Management And Wear Leveling In NAND Flash" and published 12 Nov. 2010, defines "WLC: Wear Level Count is the number of erases on the block".

According to certain embodiments, the remaining erase time is anticipated for each page, to enable further optimization of the wear leveling over pages in the device (and hence of the device's total lifetime) based on the anticipated page life expectancy. For example, if page #1 is erased within 10 ms and page #2 is erased within 20 ms, page #1 may be expected to withstand more erase cycles than page 1 which may be taken into account in a suitable wear level algorithm e.g. for next-page selection.

Certain embodiments seek to provide data for use by any suitable "best choice" algorithm for selecting a next-page for erasure/programming, e.g. as described in the following description of conventional page management algorithms: Agrawal, N. et al, "Design Tradeoffs For SSD Performance", appearing in the Proceedings Of The USENIX Technical Conference, June 2008, available at the following http link: research.microsoft.com/pubs/63596/usenix-08-ssd.pdf, or more generally any known page management algorithm in the art of nonvolatile memory storage.

Certain embodiments seek to leverage slowdown in the aging of single flash memory device pages.

Certain embodiments seek to provide an alternative flash memory management algorithm for selecting a next-page for erasure/programming which, rather than using lowest Wear Level Count (WLC) as a criterion of bestness, uses lowest accumulated erase time as one of its bestness criteria, or its sole criterion of bestness.

Certain embodiments seek to level the wear over a flash memory's pages by comparing plural pages' respective erase/program accumulated erase times e.g. when selecting at least one next-page on which to write.

It is appreciated that the page erase methods shown and described herein are useful in conjunction with a wide variety of page management algorithms.

The present invention typically includes at least the following embodiments:

Embodiment 1. A system for improving utilization of a nonvolatile flash memory device which has pages whose guaranteed per-cycle erase time and guaranteed number of cycles are known, the system comprising:

a. erase time determination functionality operative to provide individual pages' de facto erase time per cycle for at least one cycle;

b. de-facto total erase-time accumulation functionality operative to store each individual page's cumulative, over cycles, de facto erase time (aka "de facto total erase time" aka "page attribute (b)") including incrementing, for each erase cycle to which an individual page is subjected, by the individual page's de facto erase time per cycle as provided by the erase time measurement functionality; and c. flash memory page usage monitoring functionality operative to control usage of pages in flash memory including selecting at least one individual flash memory page depending on a comparison between the individual flash memory page's de facto total erase time and a guaranteed erase time computed as a product of the guaranteed per-cycle erase time and of the guaranteed number of cycles.

Typically, the guaranteed number of cycles comprises an "endurance" value stipulated in a flash device specification.

Embodiment 2. A computer program product, comprising a non-transitory tangible computer readable medium having computer readable program code embodied therein, the computer readable program code adapted to be executed to implement a method for improving utilization of a nonvolatile flash memory device which has pages whose guaranteed per-cycle erase time and guaranteed number of cycles are known, the method comprising:

a. using erase time determination functionality to provide individual pages' de facto erase time per cycle for at least one cycle;

b. using de-facto total erase-time accumulation functionality to store each individual page's cumulative, over cycles, de facto erase time ("de facto total erase time") including incrementing, for each erase cycle to which an individual page is subjected, by the individual page's de facto erase time per cycle as provided by the erase time measurement functionality; and c. using flash memory page usage monitoring functionality to control usage of pages in flash memory including selecting at least one individual flash memory page depending on a comparison between the individual flash memory page's de facto total erase time and a guaranteed erase time computed as a product of the guaranteed per-cycle erase time and of the guaranteed number of cycles.

Embodiment 3. A system according to any of the preceding embodiments wherein the de-facto total erase-time accumulation functionality comprises firmware code which defines a total erase-time variable dedicated to hold total erase-time for each page in nonvolatile memory.

Embodiment 4. A system according to any of the preceding embodiments wherein the variable is, for each page p, initialized to zero at a beginning point of the device's lifetime, and is incremented by page p's stored de facto erase time per cycle each time the page is erased such that the total erase-time variable holds the de facto total erase time at any given moment.

Typically, the stored de facto total erase time is not fixed but rather is repeatedly incremented by the actual, measured, erase time of the most recent erase operation of page p.

Embodiment 5. A system according to any of the preceding embodiments wherein the erase-time measurement functionality is operative to measure pages' de facto erase time per cycle and store a "page attribute (a)", which is a function of the de facto erase time per cycle, accordingly.

Embodiment 6. A system according to any of the preceding embodiments wherein the function comprises a unity function for at least one page hence the at least one page's attribute (a) comprises the at least one page's de facto erase time per cycle.

Embodiment 7. A method for improving utilization of a nonvolatile flash memory device which has pages whose guaranteed per-cycle erase time and guaranteed number of cycles are known, the method comprising:

a. using erase time determination functionality to provide individual pages' de facto erase time per cycle for at least one cycle;

b. using de-facto total erase-time accumulation functionality to store each individual page's cumulative, over cycles, de facto erase time ("de facto total erase time") including incrementing, for each erase cycle to which an individual page is subjected, by the individual page's de facto erase time per cycle as provided by the erase time measurement functionality; and c. using flash memory page usage monitoring functionality to control usage of pages in flash memory including selecting at least one individual flash memory page depending on a comparison between the individual flash memory page's de facto total erase time and a guaranteed erase time computed as a product of the guaranteed per-cycle erase time and of the guaranteed number of cycles.

Embodiment 8. A system according to any of the preceding embodiments wherein the erase-time measurement functionality comprises firmware code which is run for each erase of each page.

Embodiment 9. A system according to any of the preceding embodiments wherein for at least one page, the firmware provides an initial value to an erase time variable then increases the initial value by an amount of time step by step, wherein in each such step the at least one page is being erased by the amount of time, until erase quality is deemed sufficient at which point the erase time variable's value is taken to be the most recent de facto erase time per cycle for the at least one page.

Embodiment 10. A system according to any of the preceding embodiments wherein the page attribute (a) is held in nonvolatile memory.

Embodiment 11. A system according to any of the preceding embodiments and wherein flash memory pages with low de facto erase time per cycle are used for data storage, in preference to flash memory pages with high erase time per cycle thereby to increase the number of cycles that a given flash memory may be subjected to.

Embodiment 12. A system according to any of the preceding embodiments wherein next-page selection logic is employed to select a page to be next written on and the logic combines:

a first page selection consideration whereby flash memory pages with low de facto erase time per cycle are preferred, all other things being equal, over flash memory pages with high erase time per cycle; and at least one additional page selection consideration.

Embodiment 13. A system according to any of the preceding embodiments wherein the page attribute (b) is held in nonvolatile memory.

Embodiment 14. A system according to any of the preceding embodiments wherein the additional page selection consideration comprises the number of erase cycles thus far applied to various flash memory pages such that pages to which a low number of erase cycles have thus far been applied are preferred, all other things being equal, over flash memory pages to which a high number of erase cycles have thus far been applied.

Embodiment 15. A system according to any of the preceding embodiments wherein the erase time determination functionality uses a counter to estimate individual pages' de facto erase time per cycle by counting how many erase operations of known duration are needed to achieve erasure of the individual pages.

Embodiment 16. A system according to any of the preceding embodiments wherein the function comprises post-processing operative to combine plural erase times which are generated for plural cycles of a specific page respectively and which are stored at least until the post-processing combining operation is performed, in nonvolatile memory.

Embodiment 17. A system according to any of the preceding embodiments wherein the post-processing comprises computing a moving average over a plurality of most recent de facto erase times of the specific page.

Embodiment 18. A system according to any of the preceding embodiments wherein the flash memory page usage monitoring functionality is operative for selecting at least one individual flash memory page for a total number of cycles which exceeds the guaranteed number of cycles.

Embodiment 19. A system according to any of the preceding embodiments and also comprising:

a processing unit (aka processor) configured for executing firmware code stored in memory; and a Flash memory interface control unit coupled to the processing unit and to the nonvolatile flash memory device and operative to control the flash memory device's execution of at least read, program and erase operations including selecting a flash memory page from among the flash memory device's pages for execution of at least one erase operation and commanding that at least one erase operation terminate after a preprogrammed duration determined by the processing unit, and wherein the firmware code is operative to control the flash memory interface control unit and includes the erase time determination functionality, the de-facto total erase-time accumulation functionality, and the flash memory page usage monitoring functionality.

The Flash memory interface control unit which interfaces the physical flash device as known in the art may be implemented in hardware and the firmware may control the Flash memory interface control unit; the firmware's controlling operation/s may for example include the following operations, suitably ordered e.g. as follows:

providing the GET parameter described herein to the Flash memory interface control unit to enable the Flash memory interface control unit to execute a flash erase operation accordingly, e.g. as per operation 3 of FIG. 1, typically to execute a flash erase operation whose duration is GET;

using the Flash memory interface control unit to verify the erase e.g. as per operation 4 of FIG. 1;

effecting another incremental erase followed by another erase verification e.g. as per operation 6 of FIG. 1; and based on the results the firmware updates parameters, e.g. as per operations 7, 8 in FIG. 1, and moves on to the next round or iteration of the application in which new data for programming comes in a page is selected anew and so forth.

Embodiment 20. A system according to any of the preceding embodiments wherein the post-processing comprises generating a linear approximation of an upcoming erase time not yet measured for an iteration i, based on a linear combination of erase times measured in iterations preceding iteration i.

Typically, linear approximation includes computing coefficient A in Y=AX, e.g. by computing the difference between the most recent (current iteration i) measured erase time and the erase time measured in the iteration before i (iteration i−1), and adding this difference to the erase time measured for iteration i as a prediction for the erase time to be measured in iteration (i+1). Alternately, taking the N most recent erase times, estimating the A using any suitable method, e.g. least mean squares, and adding A to the most recent erase time. More generally, any combination e.g. linear combination of erase times measured for iterations directly or otherwise preceding an iteration i, may be used to approximate the erase time of iteration i.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

BRIEF DESCRIPTION OF THE DRAWINGS

Certain embodiments of the present invention are illustrated in the following drawings:

FIG. 1 is a simplified flowchart illustration of a method for using erase time determination functionality to provide individual pages' de facto erase time per cycle for at least one cycle.

FIG. 2 is a simplified flowchart illustration of a method for improving utilization of a nonvolatile flash memory device, having pages, and whose guaranteed per-cycle erase time and guaranteed number of cycles are known.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

DETAILED DESCRIPTION OF CERTAIN EMBODIMENTS

Commercially available flash memory devices come with a specification or datasheet stipulating "Erase Time", usually given both per page (for page erase) and per the whole array (for "mass erase" of all pages). Erase Time (pertaining to a single cycle of erasure) is usually specified with minimal (termed herein "minimal erase time per erase/program cycle") and maximal boundaries. Erasure for a period of time exceeding the minimum is guaranteed by the manufacturer to result in good erase. Erasure for a period of time exceeding the maximum may cause damage resulting from "over-erase". So, pages erased for a period of time intermediate the minimal and maximal boundaries are guaranteed by the manufacturer to yield a good erase while avoiding over-erasure. In the present specification, "erase time" refers to minimal (rather than maximal) erase time per-page (rather than per the whole array) unless otherwise indicated.

Commercially available flash memory devices' specification or datasheet also stipulate the device's "endurance", typically among other indications of the device's reliability characteristics. The term "Endurance" is normally used to refer to the number of erase/program cycles that, if not exceeded for any given page, will, the flash manufacturer guarantees, result in adequate performance of the flash memory device and prevent premature "death" of page/s or even an entire device. The test method for this parameter may be in accordance with JEDEC Standard A117, although this is not intended to be limiting.

The true limitation determining how long a flash memory page can usefully endure is not the number of erase/program cycles it has undergone but the total (over all cycles) erase time. Since, as described above, the specification also stipulates the erase time per erase cycle, a workable representation of the true limitation of each flash memory page, namely the total (over all cycles) workable erase time, can be computed by application developers e.g. as no less than the product of (minimal erase time per erase cycle) or, as the product of (maximal erase time per erase cycle—if this parameter is specified by the flash supplier) times (endurance e.g. number of erase/program cycles). The latter alternative may further extend use of the device while still remaining within the bounds of the flash supplier specifications.

Then, application developers may use each page up to that limit, including sometimes using a page beyond its stipulated endurance (e.g. exceeding its specified number of erase/program cycles) if this can be done without exceeding the above product.

But the specification-stipulated erase time per erase cycle is in fact a "worst case" value in the sense that many (say 15% or 25% or one-third or more of the flash memory's pages, or even most) of the flash memory's pages, are likely to have a de facto erase time per erase cycle which is significantly shorter, e.g. 5% or 10% or 20% or 30% shorter or more, than the specification-stipulated erase time per erase cycle.

So, if erase time determination functionality can be provided which is operative to measure individual pages' de facto erase time per cycle (page attribute (a)) and if a total erase time accumulation functionality can be provided to accumulate each individual page's de facto total erase time (page attribute (b)), using each erase cycle's real de facto erase time given the page which was erased, then c. the application developer may safely subject flash memory pages to a total number of cycles which exceeds the specification-stipulated endurance, depending on a comparison between the de facto total erase time (page attribute (b)) and the erase time computed as a product of the following parameters in the device's specification: guaranteed per-cycle erase time and guaranteed number of cycles. This may be implemented e.g. by counting time, or by counting operations of known durations e.g. having a common pre-defined duration, typically until the erase operation is known or deemed to have been completed.

Typically, erase-time measurement functionality is provided which is operative to measure pages' de facto (aka "practical") erase time per cycle and store page attribute (a). Any suitable technology may be used to implement this functionality. For example, firmware code may be provided which may, say, be run for each erase of each page and may be operative to count operations and eventually, by multiplication by the known operation duration, compute how much time was spent per erase operation. Alternatively, for hardware implementations using hardware state machines and associated time keeping elements, a suitable hardware timer and/or counter, counting time elapsed until the erase is finished, may be provided. The firmware may provide an arbitrarily small initial value to an erase time variable (e.g. the guessed erase time (GET) parameter described below) and increases the variable step by step e.g. as described herein with reference to FIG. 1, until an empirical erase time is reached which may be taken to be the de facto (aka "practical") erase time per cycle for that page. Or, post-processing may be performed on the empirical erase times generated for various erases of a specific page n. For example, the "current empirical erase time" of page n may be defined not as the most recent "measurement", but instead as the average of plural (e.g. 2-15) most recent measurements (the mean of the empirical erase times generated by the firmware code run for the 2 or . . . or 15 most recent erases of page n).

More generally, any sort of post-processing may be performed which is found to result in enhanced (better) prediction. As a page ages, the practical erase times of erasures thereof may remain generally uniform or may fluctuate e.g. slightly increase. To enhance prediction, a few devices may be experimentally cycled "to death", while measuring practical erase times per page over each page's lifetime; approximations which best predict an (N+1)'th practical erase time, e.g. from an earlier e.g. N'th practical erase time for the same page, or, as described above, from a predefined sequence of earlier practical erase times for the same page, may then be developed accordingly.

Typically, pages' de facto (aka "empirical") erase time per cycle is held in nonvolatile memory so that the de facto (aka "empirical") erase time per cycle parameter persists through power off/on.

Typically, total erase-time accumulation functionality is provided which is operative to accumulate the de facto total erase time and store page attribute (b), using each erase cycle's real de facto erase time given the page which is being erased. Any suitable technology may be used to implement this functionality. For example, firmware code may be provided which defines a variable dedicated to hold total erase-time for each page in nonvolatile memory. This variable is, for each page p, initialized to zero at the beginning of the device's lifetime, and is incremented by page p's stored de facto (aka "empirical") erase time per cycle each time the page is erased such that the total erase-time variable holds the de facto total erase time at any given moment.

A further mechanism for utilizing page attributes a (and optionally b) above, is the following example application d: flash memory pages with relatively low de facto erase time per cycle (e.g. a low level of page attribute (a)) may be preferred over flash memory pages with relatively high erase time per cycle (e.g. a high level of page attribute (a)), so as to increase the number of cycles that a given flash memory may be subjected to. It is appreciated that any suitable next-page selection logic may be employed to select a page to be next written on. The logic may use any suitable arithmetic or logical formula for combining the following: application-specific and/or device-specific considerations for page selection, plus the consideration of preferring flash memory pages with low de facto erase time per cycle (page attribute (a) above) over flash memory pages with high erase time per cycle.

According to certain embodiments, one consideration in page management is to maintain wear level at a uniform level over pages to the extent possible. Since the more pages are available at generally the same wear level, the more flexibility of choice results as to selecting the next page to recycle. In contrast, if some pages "die" much earlier than others, this reduces page management flexibility.

FIG. 1 is an example method which may be performed (e.g. run) when new data needs to be stored in a flash memory device, typically including selection of a page from among the flash memory device's pages, which will store the new data hence will undergo recycling.

General (as opposed to page-specific) parameters employed by the algorithm may include some or all of the following; all numerical values e.g. for max erase time (MET), ETIS, TPEN, etc., are of course merely illustrative:

Max-erase-time (MET) specified by the supplier of the memory—aka "specification-stipulated maximum erase time"=(say) 125 ms—from flash vendor/supplier specification, guarantees robust functionality through the lifetime of the device, taking into account at least manufacturing variances between devices and/or between pages and/or operative circuits associated with pages within a single device, and device erosion. Typically, if this erase time is applied, i.e. if exactly this period of time is allocated to each erase cycle, the likelihood of successfully erasing the previous data is guaranteed to be 100%. If the specified maximal erase time per erase operation is exceeded, the lifetime of the memory may be shortened and/or its performance may degrade to below stated specifications for the flash memory device.

Guessed-erase-time (GET)=(say) 60 ms. p % of max erase time (MET) e.g. 50% (or 10%, 35% or 75% or any other suitable percentage) of max erase time (MET);

Guessed erase time is the starting point of the loop. Typically guessed erase time (GET) is an initial guess of the amount of time, expressed in terms of % of the max erase time (MET), which is empirically required to successfully erase a given page of flash memory (aka "empirical" or de facto erase time). If the Guess erase time is relatively low (e.g. is only a small percentage of the specification erase time, MET, as opposed to a higher percentage of max erase time (MET)) this may cause a gain in erase time if the erase time turns out, empirically, to be short, or may cause a loss in terms of performance if the erase time turns out, empirically, to be long. So, there is a trade off: If erase verification time is negligible vs. erase time, the penalty to start low is small vs. the possible gain. Conversely, if erase verification time is large vs. erase time, the penalty to start "low" is large relative to the possible gain. Therefore, a design consideration may be to begin low (e.g. even 10% or below) if erase verification time is negligible vs. erase time and begin high (e.g. even 75% or above) if erase verification time is large vs. erase time. The erase verification time refers to the time required to verify that a page of a given flash device has indeed been erased successfully or the time required to do a margin read of a whole page, or the time required to read a whole page with an erase-verify attribute; these parameters may be derived from flash specifications e.g. as described herein with reference to operation 4 in FIG. 1.

Guessed erase time (GET) may also be based on empirical results.

For example, if the specification-defined max erase time (MET) is 120 ms, experimental page erase trials may yield the finding, say, that, 90% of the pages have a practical erase time of 75 ms or higher. In such cases, 75 ms, say, may be set as the guessed erase time (GET) for all pages rather than start lower, because starting lower would be a useless waste of performance. More generally, the guessed erase time may be set to a level which is estimated to leave the practical erase time of a predeterminedly large percentage of pages, above that level. The estimated level may be determined experimentally, using information from an external source, or in any other suitable manner known in the art. If there is substantial variance in the effective GET for different pages, it is also possible to define a GET setting per page. This is suitable e.g. if the cost of the nonvolatile memory storage space required is justified by a substantial gain in page endurance resulting from setting page-specific GETs.

Erase-time-increment-step (ETIS)=(say) 10 [ms] Granularity for the flow described below; in this example—about 10% of max erase time (MET)

Total-page-erase-number (TPEN)=(say) 5000 cycles—aka "Endurance"–number of erase/write cycles which, according to a flash memory vendor specification, can be endured without failure by (a page in) the flash memory)

Total-page-erase-time (TPET)=TPEN*max erase time (MET)–Total flash erase time which does not take into account wear level due to program Page specific parameters (for flash memory page n) which may be computed and/or stored in computer memory e.g. as page attributes, may include some or all of:

Current-practical-erase-time (CPETn)—the empirically recorded duration e.g. in ms, of the most recent successful erase performed on page n Accumulated-practical-erase-time (APETn)—the empirically recorded total duration, e.g. in ms, of all accumulated erase cycles performed on page n Page-erase-accumulated-number (PEANn)={Number of erases performed thus far on page n}; once accumulated, this actual number partially represents the practical endurance of page n Page-erase-estimated-remaining-time (PERTn)=may be estimated, e.g.: PERTn=Total-page-erase-time (TPET)–APETn Page-estimated-endurance-left (PEELn)=Estimation of Number of erases left for page n (remaining erase cycles i.e.) PERT and PEAN information is stored for each page n in flash memory e.g. in the page header. Each time page n is erased, PERT and PEAN are updated for page n.

ILAN PEELn may be directly computed from PERT and PEAN e.g. as described below in detail.

Generally, page erase may be set according to the empirical erase time which may be characterized on occasion e.g. at time 0 (the point in time at which the device is first used) per page and/or later e.g. the "Empirical erase time" may be re-characterized once or more (e.g. each time a page is erased, or every few (e.g. each 5 or 10 or 50 or other number of) erase operations; e.g. periodically.

The Accounting page erase-based lifetime may be based on TPET, the allowed total erase time, as stipulated in the flash memory's specification put out by the flash vendor. For example, the flash vendor may specify TPEN, the endurance (in cycles) and the erase time per erase operation, MET (in msec/operation) and the total erase time that the user of the flash may rely on is up to Total-page-erase-time (TPET)=the product of the number of endurance cycles x erase time per erase operation. For example, if max erase time (MET)=125 ms and TPEN=5K cycles, the Total-page-erase-time (TPET) is 5K×125 ms=625 second.

FIG. 1 is a a simplified flowchart illustration of a suitable method for increasing the flash memory's effective life-time. The method of FIG. 1 may include some or all of the following operations, suitably ordered e.g. as shown:

1. Starting conditions typically include:
    a. For simplicity, all flash pages are assumed to be written. In fact, all flash pages are initially empty but the empty pages may then be written sequentially until they are all full. However, the present invention does not assume this and more generally, the teachings herein are also suited, mutatis mutandis, to use cases which do not necessarily simply go to the next empty page and to situations in which less than all pages are written.
    b. initially, all pages' PERTn values are initialized to PERTn=Total-page-erase-time (TPET).
    c. new data has just arrived for storage in the flash.
2. Apply any conventional next-page priority management scheme/algorithm e.g. as described in Agrawal et al cited herein to identify the "best choice" page to be recycled (aka "current page" for current iteration of this flow)

Next, a stepwise erase operation including plural stages, is executed; these may be terminated once the page has been verified to have been well-enough erased. The stepwise erase operation may be designed to include any of the teachings known in the art regarding "smart erase", e.g. in US20060053247. It is appreciated that erase time is typically pre-timed, in that a suitable timer is employed to ensure that each step/increment of erase time has a pre-defined duration, e.g. 10 mS. So, the total time accumulated over the erase cycle may be determined by counting the steps required to "finish" the erase operation (to achieve high enough erase quality, for example).

The stepwise erase operation may for example include the following operations 3-6, suitably ordered e.g. as follows:
3. Apply Page Erase of guessed erase time (GET) duration to the current page selected in operation 2.
4. Verify erase quality (e.g. utilize a stress-read feature available in embedded flash arrays. For example, for state of the art TSMC.com flash technology, a read operation's "erase verify" property may be used to check erase quality. This type of read is termed "margin read" in TSMC terminology.
5. If erase quality is good, using any suitable goodness criterion known in the art, add current page's empirical erase time CPETn to APETn, the actual cumulative erase time applied, and go to step 7
6. Else, add ETIS to current page's empirical erase time CPETn; apply (further) erase whose duration is ETIS, and go to step 5.
7. Each time a page n is recycled, reduce page n's practical (aka empirical) endurance by 1 e.g. increment PEANn by 1.
8. new Page-erase-estimated-remaining-time PERTn=current (i.e. from previous iteration of this flow) Page-erase-estimated-remaining-time (PERTn)–CPETn (the duration e.g. in ms, of the most recent successful erase).
9. Operations 2-8 may be iterated time and again, e.g. each time new data arrives for storage in the flash. Each time the above process is carried out, the resulting empirical erase time per page is expected to be less than max erase time (MET).

It is appreciated that as more and more iterations are performed, data accumulates regarding the flash memory pages, typically including each page's empirical erase time CPETn and empirical/estimated remaining erase cycles (PEELn). For next-page-select, all or some pages for which PEELn=0 or for which PEELn is too close (as determined by a threshold) to zero may be removed from consideration.

In the i'th iteration (i>1), operation 2 typically uses outputs generated by operations 3-8 in iteration (i-1) e.g. each page n which has undergone erasure using the above flow is characterized by the following parameters, which may be stored:
i. Current PEANn as updated in operation 7 above.
ii. Current CPETn as updated in operation 6 above.
iii. Current PERTn as updated in operation 8 above.

These parameters or others may be used to manage next-page priority when performing operation 2 above. For example, the following sub-operations I, II may be followed in order to perform operation 2:
Sub-operation I: PERTn is estimated e.g. as follows:
(a.1—stepwise implementation of operation 8) PERTn=Total-page-erase-time (TPET)–APETn
or
(a.2—alternative to operation 8) PERTn=Total-page-erase-time (TPET)–APETn–(Constant*PEANn)

Constant*PEANn is a correction or safety factor which takes into consideration degradation of flash erase time. Even after computing an estimated remaining erase time it may be desirable to provide an additional safety guard band which may depend on the numbers of cycles done so far.

Numerical example:
Total-page-erase-time (TPET)=125 ms*5K=625 seconds
APET=340 seconds
PEANn=2800 cycles
Constant=0.01
PERTn a.1=625–340=285 seconds
PERTn a.2=625–340–(0.01*2800)=257 seconds In the above example, the average practical erase time thus far has been 340/2800=121 ms. The factor or constant "predicts" that the number of remaining erase cycles is about (285 s–257 s)/121 ms=231 cycles less than the prediction of alternative a.1 above. This factor may be derived from the characteristics of flash erase time over the flash device's lifetime or from whichever safety level or risk control an implementer may wish to apply. If the erase time is found to be very stable for a given technology, then this factor can be zeroed (constant=0), at which setting a.1 and a.2 converge to one another.

Regarding a.2, some of the flash wearing may not be optimized by using "shortest empirical erase time" as a (sole) criterion for selecting a next page—e.g. because program may also cause flash wearing. Also, the practical (empirical) erase time may change during the life time of the page (e.g. may increase as the page ages).

Sub-operation II: Using the estimated PERTn generated by operation I, a given page's PEELn can be estimated accordingly, e.g. as follows:
(b.1) PEELn=PERTn/CPETn
(b.2) PEELn=PERTn*PEANn/APETn The page with the highest current remaining endurance (PEELn) may be the page selected by operation II as the next page on which to write, unless other use-case specific considerations irrelevant to the scope of this patent application, override. If such considerations exist, they may be combined with the consideration of the relative size of each candidate next-page's PEELn in any suitable manner. For example, a logical if-then rule may be formulated to determine which consideration governs, or each page may be assigned a score based on a suitable weighted combination of the page's PEELn and other characteristics of the page relevant to the other use-case specific considerations.

Numerical example, if options a.1 and b.1 above are used: Assume max erase time (MET)=125 ms, TPEN=5K in which case Total-page-erase-time (TPET)=625 seconds. Then, Page n is characterized by:
CPETn=80 ms
PERTn=250 seconds
PEELn=250/0.080=3,125 remaining erase cycles.

If a given page is well-erased within, say, 10 ms, the implication is that more erase operations can be applied (e.g. more than 5000 such operations if the endurance is 5000 cycles) because the flash is guaranteed to sustain at least a certain total erase time, and if some pages can be erased in less than the max erase time (MET) stipulated in the spec, more erase operations can be applied without deviating from the total erase time. This is because flash supplier specs implicitly guarantee that a given memory can sustain at least a certain total erase time and remain fully functional, meeting all performance specifications, even taking into account the known variance over VLSI circuits. This is done because each flash memory erasure moves charge from one place to another; this electrical operation slowly erodes the flash memory circuitry.

For example, given a guaranteed total erase time of X seconds, and/or a remaining total erase time of Y seconds, if it is known that a page may be erased in 10 ms, that page may then be erased twice as many times as would be possible if that page required 20 ms of erase time (as may be implied by the max erase time (MET)). It is appreciated that due to certain details of flash memory technology, circuitry variance yields significant variance in the erase time per erase operation, between pages. Therefore, some or many pages may indeed require significantly less erase time than the single max erase time (MET) value which is actually a worst-case erase time per erase operation value designed to apply to all pages. Typically the max erase time (MET) value is in fact equal to or in excess of the maximum erase time per erase operation, required by an actual or hypothetical worst-case page in the flash memory.

A second, "refined", embodiment may be employed which takes into account a possible degradation of the flash memory pages, causing the erase time per erase operation to increase slowly as the page ages e.g. as more and more erase operations are performed on the page. For example, the next page to recycle may be selected by selecting the page, in the flash memory, having the greatest number of remaining erase cycles. And/or, data being stored on the flash memory may be categorized according to the data's expected recycling rate (how often is the data anticipated to change; for example in a banking use case in which customer data is stored in flash memory, the bank customer's name almost never changes whereas the balance in the customer's account changes almost daily. Then, pages with many remaining erase cycles may be allocated to highly-recycled data whereas pages with few remaining erase cycles may be allocated to slowly-recycled data.

It is appreciated that the specific method shown in FIG. 1 for determining the empirical erase-time of a page, is not intended to be limiting; instead, any suitable method may be employed for providing an estimated empirical erase-time for individual page/s including using a stored value for this purpose, which may have been provided by an external source or by method/s outside of the scope of this invention.

FIG. 2 is a simplified flowchart illustration of a flash memory operating method in accordance with certain embodiments, which results in increased useful lifetime for flash memory devices.

In operation 210, typically, erase time determination functionality (e.g. firmware-implemented/processor-implemented) is used to provide individual pages' de facto erase time per cycle (e.g. as per the flow of FIG. 1).

In step 220, typically, de-facto total erase-time accumulation functionality (e.g. firmware-implemented/processor-implemented) is operative to store each individual page's cumulative, over cycles, de facto erase time ("de facto total erase time") typically including incrementing, for each erase cycle to which an individual page is subjected, by the individual page's de facto erase time per cycle as estimated by the erase time measurement functionality.

In operation 230, typically, flash memory page usage monitoring functionality (e.g. firmware-implemented/processor-implemented) controls use of pages in flash memory including subjecting at least one individual flash memory page to (e.g. selecting at least one individual flash memory page for) a total number of cycles which exceeds the guaranteed number of cycles, depending on a comparison between the individual flash memory page's de facto total erase time and a guaranteed erase time computed as a product of the guaranteed per-cycle erase time and of the guaranteed number of cycles. For example, the flash memory page usage monitoring functionality may select, at least on occasion, at least one next-page on which to write, which has already undergone a total number of cycles which equals or exceeds its guaranteed number of cycles, if warranted by a comparison between the individual flash memory page's de facto total erase time and a guaranteed erase time computed as a product of the guaranteed per-cycle erase time and of the guaranteed number of cycles e.g. if the individual flash memory page's de facto total erase time has not yet reached the guaranteed erase time, despite the fact that the individual flash memory page's total number of cycles equals or exceeds the individual flash memory page's guaranteed number of cycles (aka Endurance). For example, given a flash device specification guaranteeing, say, 5K endurance cycles and an erase time (per cycle) of 100 ms, the total erase time (e.g. guaranteed erase time TPET) is the product of these i.e. 5K×100 ms. In this case, if an individual flash memory page's de facto total erase time has not yet reached 5K×100 ms, this page may be selected as a next-page even if its total number of cycles already equals or exceeds 5k.

Optionally, the method of FIG. 2 may use next-page selection logic when, or each time, it is desired to select a page to be next written on. The next-page selection logic may employ a first page-selection consideration whereby flash memory pages with low de facto erase time per cycle are preferred over flash memory pages with high erase time per cycle; and, optionally, at least one additional page selection consideration other than the first page-selection consideration.

According to an embodiment of the present invention, the flash memory page usage monitoring functionality includes firmware code which accesses a computer storage repository which stores an indication of which flash memory pages (including even flash memory pages whose total number of cycles equals or exceeds the individual flash memory page's guaranteed number of cycles) are "still operational" i.e. have a de facto total erase time which is still below the guaranteed erase time (product of the guaranteed per-cycle erase time and of the guaranteed number of cycles), as opposed to "no longer operational" flash memory pages whose de facto total erase time has already exceeded the guaranteed erase time— regarding which the computer storage repository does not store same indication. The firmware code implements next-page selection logic which uses any suitable consideration/s or criteria, to select a next page on which to erase/write, applying this logic only to the "operational" flash memory pages indicated as such in the computer storage repository, and not to the "no longer operational" flash memory pages. This logic may or may not prefer "still operational" flash memory pages with low de facto erase time per cycle over "still operational" flash memory pages with high erase time per cycle.

Advantages of Certain Embodiments Include:

It is advantageous for flash memory to live as long as possible despite unpredictable user activity in terms of storage contents edits, deletions, and other flash memory operations. For example, flash memory is typically used to store code and/or data. Whereas, in most applications, code is typically relatively stable, data typically has to be cycled frequently. Generally, flash space available for storage is limited, and optimizing usage of that space, as per any of the teachings herein, extends the actual lifetime of a device's storage space hence of the device as a whole, given that flash devices' lifetimes are physically limited as is the amount of space available for storage.

A particular advantage of certain embodiments is the ability to harness the difference between erase-time as defined in the flash memory's specification, and the actual erase time, so as to increase the actual endurance of the flash memory device beyond the endurance stipulated in the flash memory device's specification. This ability is a result of variance between the actual erase times of pages in the same flash memory device. According to certain embodiments, shortest-empirical-erase considerations are applied per-page and not over the device. Each page is evaluated individually per that page's actual performance, as opposed to conventional technologies in which the worst case page limits the guaranteed endurance (lifetime) of the product as a whole.

Once the following page attribute/s have been generated e.g. as described herein:

a. pages' de facto erase time per cycle (page attribute (a)) and/or b. de facto total erase time (page attribute (b)), e.g. using each erase cycle's real de facto erase time given the page which was erased, then optimization/s may be achieved synergistically, by receiving, and using, one or both of the above page attributes as a consideration contributing to, any one of, or any combination of, the following optimizations:

Optimization 1—It may be desired to allocate or even re-locate code, specifically, to pages with relatively extensive, e.g. longest available, de facto erase time, since such pages may be expected to have the lowest endurance. More generally, it may be desired to allocate or even re-locate data known to be relatively persistent (known to have a low recycling rate—such as but not limited to code) to pages with relatively extensive de facto erase time and conversely to allocate or even re-locate data known to have a low level of persistence (known to have a high recycling rate) to pages with relatively little de facto erase time.

Optimization 2—Magnitudes of de facto erase times may be used as a consideration to fine-tune and/or adapt starting point/s of stepwise erase to improve performance, e.g. by using de facto erase time as a factor to determine whether to start closer to the "target" and reduce the search time vs. starting further from the target.

In particular, guessed erase time (GET) may be determined, initially or subsequently, as a function of actual erase times. For example, if the specification-defined max erase time (MET) is 125 ms, the guessed erase time (GET) may, say, be set to 40 ms. However, if after a few erase cycles the actual (practical/empirical) erase times are found to always be at least 75 ms, then the guessed erase time (GET) might be reset higher, say to 70 ms, to eliminate iterations in the method of FIG. 1.

Optimization 3—the page with shortest available de-facto erase time may be picked in case of specific need for shortest possible page recycling (performance optimization), e.g. in case of need for shortest possible response time to a command or request involving page recycle.

Optimization 4—predict remaining life time of the device more precisely. For example, an average number of erase cycles per unit of device life may be assumed, e.g. 50 cycles per day, to support an estimate, based on the above page attributes, of how many remaining days of lifetime the device still has.

Optimization 5—disallow low-priority erase/program requests (e.g. requests for further recycling for what is deemed to be unimportant reasons) if it is known that a device has only a short remaining lifetime.

Optimization 6—de facto erase time per cycle may be a consideration used in isolation or in combination with other considerations, for page selection e.g. to prefer, all other things being equal, flash memory pages with low de facto erase time per cycle over flash memory pages with high de facto erase time per cycle.

Typically, if any one or more of the above optimizations 1-6 are provided, they are provided in combination with the functionality of increasing the total number of available erase cycles e.g. the number of available erase cycles for at least one page or even for most pages or even per page; as described herein the application developer may safely subject flash memory pages to a total number of cycles which exceeds the specification-stipulated endurance.

It is appreciated that any suitable erase-verification technology built into flash devices may be used herein and reading in TSMC.com's erase verify mode (aka margin read) is only one possible implementation.

It is appreciated that erase time determination functionality may not compute individual pages' de facto erase time per cycle e.g. by counting and may instead, say, receive individual pages' de facto erase time per cycle from an external source.

The firmware described herein, if provided, may be held in nonvolatile memory, e.g. Flash or ROM. Any suitable technology may be used to prevent limitations of the location of the firmware from interfering with flash management.

Alternatively, certain embodiments described herein may be implemented partly or exclusively (i.e. without firmware) in hardware in which case some or all of the variables, parameters, sequential operations and computations described herein may be in hardware.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

Features of the present invention, including operations, which are described in the context of separate embodiments, may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein. Conversely, features of the invention, including operations, described for brevity in the context of a single embodiment or in a certain order may be provided separately or in any suitable subcombination, including with features known in the art (particularly although not limited to those described in the Background section or in publications mentioned therein) or in a different order. "e.g." is used to denote an example not intended to be limiting. Each method may comprise some or all of the operations illustrated or described, suitably ordered e.g. as illustrated or described herein.

The invention claimed is:

1. A system for improving utilization of a nonvolatile flash memory device which has pages whose guaranteed per-cycle erase time and guaranteed number of cycles are known, the system comprising:

at least one processor configured to:
  a. provide individual pages' de facto erase time per cycle for at least one cycle;
  b. store each individual page's cumulative, over cycles, de facto erase time (aka "de facto total erase time" aka "page attribute (b)") including incrementing, for each erase cycle to which an individual page is subjected, by the individual page's de facto erase time per cycle as provided by erase-time determination functionality; and
  c. control usage of pages in flash memory including selecting at least one individual flash memory page depending on a comparison between:
    (i) the individual flash memory page's de facto total erase time, and
    (ii) a guaranteed erase time computed as a product of the guaranteed per-cycle erase time and the guaranteed number of cycles, wherein:
said erase-time determination functionality comprises firmware code which is run for each erase of each page, wherein for at least one page, the firmware provides an initial value to an erase time variable and then increases the initial value by an amount of time step by step;
in each said step, the at least one page is being erased by said amount of time until erase quality is sufficient at which point the erase time variable's value is taken to be the most recent de facto erase time per cycle for the at least one page; and
said erase time determination functionality uses a counter to estimate individual pages' de facto erase time per cycle by counting how many erase operations of known duration are needed to achieve erasure of said individual pages.

2. A system according to claim 1 wherein the de-facto total erase-time accumulation functionality comprises firmware code which defines a total erase-time variable dedicated to hold total erase-time for each page in nonvolatile memory.

3. A system according to claim 2 wherein said variable is, for each page p, initialized to zero at a beginning point of the device's lifetime, and is incremented by page p's stored de facto erase time per cycle each time the page is erased such that the total erase-time variable holds the de facto total erase time at any given moment.

4. A system according to claim 1 wherein said erase-time determination functionality is operative to measure pages' de facto erase time per cycle and store a "page attribute (a)", which is a function of the de facto erase time per cycle, accordingly.

5. A system according to claim 4 wherein said function comprises a unity function for at least one page hence the at least one page's attribute (a) comprises the at least one page's de facto erase time per cycle.

6. A system according to claim 4 wherein said page attribute (a) is held in nonvolatile memory.

7. A system according to claim 4 wherein said function comprises post-processing operative to combine plural erase times which are generated for plural cycles of a specific page respectively and which are stored at least until said post-processing combining operation is performed, in nonvolatile memory.

8. A system according to claim 7 wherein said post processing operative to combine comprises computing a moving average over a plurality of most recent de facto erase times of the specific page.

9. A system according to claim 7 wherein said post-processing operative to combine comprises generating a linear approximation of an upcoming erase time not yet measured for an iteration i, based on a linear combination of erase times measured in iterations preceding iteration i.

10. A system according to claim 1 and wherein flash memory pages with low de facto erase time per cycle are used for data storage, in preference to flash memory pages with high erase time per cycle thereby to increase the number of cycles that a given flash memory may be subjected to.

11. A system according to claim 10 wherein next-page selection logic is employed to select a page to be next written on and said logic combines:
  a first page selection consideration whereby flash memory pages with low de facto erase time per cycle are preferred, all other things being equal, over flash memory pages with high erase time per cycle; and
  at least one additional page selection consideration.

12. A system according to claim 11 wherein said additional page selection consideration comprises the number of erase cycles thus far applied to various flash memory pages such that pages to which a low number of erase cycles have thus far been applied are preferred, all other things being equal, over flash memory pages to which a high number of erase cycles have thus far been applied.

13. A system according to claim 1 wherein the flash memory page usage monitoring functionality is operative for selecting at least one individual flash memory page for a total number of cycles which exceeds the guaranteed number of cycles.

14. A system according to claim 1 and also comprising:
  a processing unit (aka processor) configured for executing firmware code stored in memory; and
  a Flash memory interface control unit coupled to said processing unit and to the nonvolatile flash memory device and operative to control the flash memory device's execution of at least read, program and erase operations including selecting a flash memory page from among the flash memory device's pages for execution of at least one erase operation and commanding that at least one erase operation terminate after a preprogrammed duration determined by the processing unit,
  and wherein the firmware code is operative to control the flash memory interface control unit and includes said erase-time determination functionality, said de-facto total erase-time accumulation functionality, and said flash memory page usage monitoring functionality.

15. A system according to claim 1 wherein in each said step the at least one page is erased by said amount of time, until erase quality is verified to be sufficient and wherein a stress-read feature built into the flash memory device is used to verify that the erase quality is sufficient.

16. A system according to claim 15 wherein said amount of time is a fraction of the guaranteed per-cycle erase time.

17. A computer program product, comprising a non-transitory tangible computer readable medium having computer readable program code embodied therein, said computer readable program code adapted to be executed to implement a method for improving utilization of a nonvolatile flash memory device which has pages whose guaranteed per-cycle erase time and guaranteed number of cycles are known, the method comprising:
  a. using erase time determination functionality to provide individual pages' de facto erase time per cycle for at least one cycle;
  b. using de-facto total erase-time accumulation functionality to store each individual page's cumulative, over cycles, de facto erase time ("de facto total erase time") including incrementing, for each erase cycle to which an individual page is subjected, by the individual page's de facto erase time per cycle as provided by the erase time determination functionality; and c. using flash memory page usage monitoring functionality to control usage of pages in flash memory including selecting at least one individual flash memory page depending on a comparison between:
   (i) the individual flash memory page's de facto total erase time, and
   (ii) a guaranteed erase time computed as a product of the guaranteed per-cycle erase time and the guaranteed number of cycles, wherein
said erase time determination functionality uses a counter to estimate individual pages' de facto erase time per cycle by counting how many erase operations of known duration are needed to achieve erasure of said individual pages.

18. A system according to claim 17 wherein said page attribute (b) is held in nonvolatile memory.

19. A method for erasing pages of a nonvolatile flash memory device which has pages whose guaranteed per-cycle erase time and guaranteed number of cycles are known, the method comprising:

a. using erase time determination functionality to provide individual pages' de facto erase time per cycle for at least one cycle;

b. using de-facto total erase-time accumulation functionality to store each individual page's cumulative, over cycles, de facto erase time ("de facto total erase time") including incrementing, for each erase cycle to which an individual page is subjected, by the individual page's de facto erase time per cycle as provided by the erase time determination functionality; and c. using flash memory page usage monitoring functionality to control usage of pages in flash memory including selecting at least one individual flash memory page depending on a comparison between:
   (i) the individual flash memory page's de facto total erase time, and
   (ii) a guaranteed erase time computed as a product of the guaranteed per-cycle erase time and the guaranteed number of cycles, wherein
said erase time determination functionality uses a counter to estimate individual pages' de facto erase time per cycle by counting how many erase operations of known duration are needed to achieve erasure of said individual pages, wherein said erasure of said individual pages includes, for at least one individual page from among plural pages in the memory device, executing a stepwise erase operation of said individual page and terminating once the page has been verified to have been well-enough erased, and wherein the stepwise erase operation includes:
   applying Page Erase of a first duration, which is less than the guaranteed per-cycle erase time, to the individual page; and
   performing the following at least once: (i) verifying erase quality; (ii) and unless erase quality is good, applying Page Erase of a second duration, which is a fraction of the guaranteed per-cycle erase time, to the individual page.

* * * * *